US012690523B2

(12) United States Patent
    Mchale et al.

(10) Patent No.: US 12,690,523 B2
(45) Date of Patent: Jul. 28, 2026

(54) BALER AND METHOD AND APPARATUS FOR DETERMINING UNIFORMITY OF THE DENSITY OF A ROUND BALE

(71) Applicant: MCHALE ENGINEERING, Ballinrobe (IE)

(72) Inventors: Padraic Christopher Mchale, Galway (IE); Martin William Mchale, Mayo (IE); Paul Gerard Mchale, Galway (IE); John Patrick Biggins, Mayo (IE); John Alexander Warren, County Mayo (IE); Dwayne Gerard Campbell, County Mayo (IE)

(73) Assignee: MCHALE ENGINEERING, Ballinrobe (IE)

( * ) Notice: Subject to any disclaimer, the term of this patent is extended or adjusted under 35 U.S.C. 154(b) by 608 days.

(21) Appl. No.: 18/007,183

(22) PCT Filed: Jul. 30, 2021

(86) PCT No.: PCT/IE2021/000012
    § 371 (c)(1),
    (2) Date: Jan. 27, 2023

(87) PCT Pub. No.: WO2022/024102
    PCT Pub. Date: Feb. 3, 2022

(65) Prior Publication Data
    US 2023/0232748 A1     Jul. 27, 2023

(30) Foreign Application Priority Data
    Jul. 30, 2020     (IE) ..................................... 2020/0168

(51) Int. Cl.
    *A01F 15/08*          (2006.01)

(52) U.S. Cl.
    CPC ...... *A01F 15/0833* (2013.01); *A01F 15/0883* (2013.01)

(58) Field of Classification Search
    CPC .. A01F 15/07; A01F 15/0833; A01F 15/0883; A01F 2015/0785
    See application file for complete search history.

(56) References Cited

U.S. PATENT DOCUMENTS 4,389,930 A *  6/1983  Rutschilling ........... A01F 15/07
                                              292/201
6,539,851 B1 *  4/2003  Wilkens .................. A01F 15/07
                                              100/88

(Continued)

FOREIGN PATENT DOCUMENTS

EP         0 437 337 A1     7/1991
EP         0 978 231 A1     2/2000
GB          2103146 A  *   2/1983   ......... A01F 15/0883

OTHER PUBLICATIONS

Written Opinion for PCT/IE2021/000012, dated Dec. 10, 2021.
International Search Report for PCT/IE2021/000012, dated Dec. 10, 2021.

*Primary Examiner* — Jimmy T Nguyen
(74) *Attorney, Agent, or Firm* — Sughrue Mion, PLLC

(57)          ABSTRACT

A belt baler comprises a first part and a second part housing belts defining a variable diameter bale chamber. The second part is pivotally coupled to the first part from a closed state for forming a bale and an open state for discharge of a bale from the bale chamber. A pair of retaining devices on respective opposite sides of the baler comprise latches on the first part engageable with corresponding latch pins on the second part for retaining the second part in the closed state. Load sensors coupled to the respective latch pins produce signals indicative of the forces induced in the respective retaining devices resulting from the pressure being applied (Continued)

by a bale in the bale chamber. The uniformity of the density of the bale across the axial length thereof is determined from the signals read from the load sensors.

16 Claims, 9 Drawing Sheets

(56)                        References Cited

U.S. PATENT DOCUMENTS

| | | | |
|---|---|---|---|
| 7,331,279 B2 * | 2/2008 | Biziorek | ................. A01F 15/08 |
| | | | 100/48 |
| 2008/0224445 A1 | 9/2008 | Viaud et al. | |
| 2020/0221643 A1 | 7/2020 | Casadei et al. | |

* cited by examiner

BALER AND METHOD AND APPARATUS FOR DETERMINING UNIFORMITY OF THE DENSITY OF A ROUND BALE

CROSS REFERENCE TO RELATED APPLICATIONS

This application is a National Stage of International Application No. PCT/IE2021/000012 filed Jul. 30, 2021, claiming priority based on Ireland Patent Application No. S2020/0168 filed Jul. 30, 2020.

FIELD OF THE INVENTION

The present invention relates to a method and an apparatus for determining uniformity of the density of a round bale as the bale is being formed in a bale chamber of a round baler, and the invention also relates to a baler.

BACKGROUND TO THE INVENTION

Balers for producing cylindrical bales of crop material, for example, cylindrical bales of hay, straw, silage and the like are well known. Such cylindrical bales, generally referred to as round bales typically are of length in the range of 600 mm to 1,500 mm, and more commonly of length in the range of 1,200 mm to 1,250 mm, and are of diameter in the range of 800 mm to 1,900 mm. Such balers may be fixed chamber balers or belt balers. In fixed chamber balers the material to be baled is rotated and pressed in a bale chamber defined by a plurality of bale rotating rollers spaced apart circumferentially around and defining the bale chamber. The bale rotating rollers are rotated to in turn rotate the bale in the bale chamber as the bale is being formed. Typically, the bale rotating rollers are rotatably carried in a first part of the baler and a second part of the baler. In general, the first part of the baler is fixed to a chassis of the baler, and the second part, which typically is pivotally coupled to the first part is pivotal between a closed state with the bale rotating rollers on the first and second parts defining the bale chamber, and an open state to facilitate discharge of a formed bale from the bale chamber.

Retaining devices for retaining the second part of the baler in the closed state are provided and are configured to retain the second part of the baler in the closed state against the pressure exerted by the bale on the bale rotating rollers as the diameter of the bale reaches its maximum diameter and further material is being fed into the bale chamber. The retaining devices are typically provided on the first and second parts of the baler at locations towards the respective axial opposite ends of the bale chamber. The retaining devices may be provided by latches which may be provided on either the first or second part of the baler, and which are engageable with receivers which are provided on the other one of the first and second parts of the baler. Alternatively, the retaining devices for retaining the second part of the baler in the closed state may comprise hydraulic rams which act between the second part of the baler and either the first part of the baler or the chassis of the baler, and typically, are provided at locations towards the respective axial opposite ends of the bale chamber.

In belt balers on the other hand, one or more tension belts are provided to define the bale chamber. The tension belts are driven to rotate the material to be formed in the bale chamber. As material to be baled is progressively fed into the bale chamber, the diameter of the bale and in turn the diameter of the bale chamber increases. This, thus, increases the tension on the belt or belts in order to press the bale. The belt or belts which form the bale chamber are carried on tensioning rollers, which in turn are carried in first and second parts of the baler. As with the fixed chamber balers, the first part of the baler is, in general, fixed to the chassis, and the second part of the baler is pivotally coupled to the first part, and is pivotal between a closed state whereby the belt or belts are enabled to form the bale chamber and to form a bale therein, and an open state for facilitating discharge of a bale from the bale chamber.

As with a fixed chamber baler, retaining devices are provided at respective locations, typically towards axially opposite ends of the bale chamber for retaining the second part of the baler in the closed state against the tension being applied to the bale by the one or more belts. The retaining devices, like the retaining devices of the fixed chamber baler may comprise latches engageable with receivers or hydraulic rams.

A feeding system is provided for feeding material to the bale chamber of both fixed chamber balers and belt balers, and the feeding system, typically, comprises a pick-up mechanism which picks up the material to be baled from a field, and feeds the material into the bale chamber. The pick-up mechanism is configured to pick up the material to be baled from an elongated sward of the material lying in the field, as the baler is being towed by a prime mover, typically, a tractor over the sward. Such balers will be well known to those skilled in the art as will be their mode of operation.

Typically, the sward of material lying in the field to be picked up by the pick-up mechanism of the baler is not always of uniform density, and may not be of uniform density across the width of the sward. Additionally, in many cases, the sward may not be of uniform width, and furthermore, the width of the sward may be less than the width of the pick-up mechanism, and may also be of width less than the axial length of the bale chamber. This, in turn, can result in the material of the sward being fed into the bale chamber non-uniformly across the axial length of the bale chamber. This in turn can result in the formed bale being of non-uniform density along its axial length. For example, if more material to be baled is fed into the bale chamber towards one axial end thereof than the amount of material being fed into the bale chamber towards the opposite axial end, the formed bale will be denser towards the axial end thereof at which the greater amount of material is fed into the bale chamber than at the other axial end thereof. Additionally, where the sward is of greater density towards one side than the other, the density of the portion of the formed bale towards the axial end thereof corresponding to the side of the sward of the greater density, will be of greater density than the portion of the bale towards the opposite axial end thereof.

While, in general, this problem arises with all types of crop material, both wet crop material and dry crop material, it is a particularly serious problem with damp and wet crop material, for example, wet and damp grass for silage. Wet and damp crop materials tend to form into lumps, which in general, do not break down while the material is being formed into a bale during formation thereof, thereby leading to non-uniformity of the density of the bale across the axial length thereof.

This problem may not be as significant in fixed chamber balers as in belt balers, due to the fact that pressure is only applied to the bale in a fixed chamber baler as the bale reaches its maximum diameter, and therefore, prior to the application of pressure to the bale, the material being baled can become more evenly distributed in the bale chamber as the bale is being rotated therein. However, in belt balers, due to the fact that pressure is continuously applied to the material as it is being rotated in the bale chamber by the belt or belts from the commencement of formation of the bale, the material being rotated by the belt or belts becomes quickly compacted in the bale chamber as the bale is being formed, with little or no opportunity for the material to be distributed axially across the bale.

As well as fixed chamber balers and belt balers, there are also balers which comprise a combination of belts and bale rotating rollers whereby the belt or belts are configured to define with the bale rotating rollers a bale chamber. In such balers which comprise a combination of belts and bale rotating rollers, where the belt or belts are configured to define a bale chamber with the bale rotating rollers of progressively increasing diameter as the bale is being formed, similar problems arise with non-uniformity of the density of the bale across its axial length as arise with belt balers.

The non-uniformity of the density of a bale across the axial length thereof during its formation is a particular problem in the case of belt balers, and in particular, belt balers which comprise two or more belts arranged side-by-side with each other, or balers which comprise a combination of one or more belts and bale rotating rollers. The non-uniformity in the density of a bale, in the case of a single belt baler, tends to urge the single belt out of alignment in a generally transversely direction relative to the normal forward direction of motion of the baler. This, leads to a number of problems, including leaking of material to be baled from the side of the baler from which the belt has been displaced. In the case of balers with two or more belts arranged side by side relative to each other, the problem can be further exacerbated, in that the individual belts are urged out of alignment transversely relative to the normal forward direction of motion of the baler, and this can lead to the transverse spacing between adjacent belts being altered, and in some cases being increased, thereby resulting in leakage of material to be baled between the belts.

There is therefore a need for a method and apparatus for determining uniformity of the density of a round bale across the axial length of the bale during formation of the bale by a baler, in order to allow corrective action to be taken to correct for non-uniformity of the density of the bale across the axial length thereof.

The present invention is directed towards providing such a method and an apparatus, and the invention is also directed towards a baler which provides for the uniformity of the density of a bale across the axial length thereof to be determined during formation of the bale.

SUMMARY OF THE INVENTION

According to the invention there is provided a method for determining uniformity of the density of a round bale across the axial length of the bale during formation of the bale by a baler, wherein the baler comprises a first part and a second part comprising a pressing means defining a bale chamber and for rotating and pressing the bale therein, the second part being moveable relative to the first part between a closed state with the pressing means operable to rotate and press a bale, and an open state for discharging the formed bale from the bale chamber, two retaining devices for releasably retaining the second part in the closed state, the retaining devices being spaced apart from each other in a direction parallel to the axial direction of the bale chamber, the method comprising monitoring a characteristic indicative of the force induced in each of the retaining devices retaining the second part in the closed state, and determining the uniformity of the density of the bale across the axial length thereof as a function of the monitored characteristics indicative of the forces induced in the respective retaining devices.

In one embodiment of the invention the uniformity of the density of the bale across the axial length thereof is determined as a function of the difference of the monitored characteristics indicative of the forces induced in the respective retaining devices.

Preferably, the degree of the uniformity of the density of the bale across the axial length thereof is determined as a function of the difference of the monitored characteristics indicative of the forces induced in the respective retaining devices.

In another embodiment of the invention the axial end of the bale toward which the density thereof is greatest is determined as being the axial end of the bale nearest the one of the retaining devices, the monitored characteristic indicative of the force induced therein is indicative of the greater of the forces induced in the respective retaining devices.

In another embodiment of the invention the values of the characteristics indicative of the forces induced in the respective retaining devices are proportional to the forces induced in the respective retaining devices. Preferably, the values of the characteristics indicative of the forces induced in the respective retaining devices are directly proportional to the forces induced in the respective retaining devices.

In one embodiment of the invention each retaining device comprises a latch coupled to one of the first and second parts of the baler, and a receiver coupled to the other one of the first and second parts thereof, the latch being releasably engageable with the receiver for releasably retaining the second part in the closed state, and preferably, the characteristic of the force induced in each one of the retaining devices is monitored by monitoring a characteristic indicative of the force induced in one of the latch and the receiver of the corresponding retaining device when the latch is engaged with the receiver.

In another embodiment of the invention the characteristic indicative of the force induced in the receiver is monitored.

In another embodiment of the invention the receiver of each retaining device comprises a latch pin extending from the one of the first and second parts of the baler, and preferably, the latch pin of each receiver extends between a proximal end and a distal end, and preferably, is secured to the one of the first and second parts adjacent the proximal end thereof, and advantageously, projects therefrom to the distal end, and preferably, the characteristic of the force induced in each one of the retaining devices is monitored by monitoring a characteristic indicative of the deflection of the latch pin of the corresponding retaining device at a location spaced apart from the proximal end thereof when engaged by the corresponding latch.

In one embodiment of the invention the characteristic indicative of the deflection of each latch pin at the location spaced apart from the proximal end thereof is determined by monitoring a characteristic of the force induced in a connecting system extending between and connecting the latch pin adjacent the location at which the deflection is to be monitored and an anchor location on the one of the first and second parts of the baler, from which the latch pin extends, and spaced apart from the latch pin. Preferably, the characteristic indicative of the deflection of each latch pin is monitored adjacent the distal end of the latch pin. Advantageously, the monitored characteristics indicative of the forces induced in the respective retaining devices comprise respective force characteristics.

In one embodiment of the invention monitoring the characteristic indicative of the force induced in each retaining device comprises reading a signal produced by one of a load sensor and a strain sensor indicative of the force induced in the corresponding retaining device.

In another embodiment of the invention the degree of non-uniformity of the density of the bale across the axial length of the bale is determined as a function of the monitored characteristics indicative of the forces induced in the respective retaining devices.

In another embodiment of the invention the method further comprises producing an output signal, the output signal comprising a signal indicative of one or both of the uniformity and non-uniformity of the density of the bale across the axial length thereof.

Preferably, the output signal comprises a signal indicative of the densities of the bale adjacent the respective axial opposite ends thereof. Advantageously, the output signal comprises a signal indicative of a direction of travel or a change in the direction of travel of the baler required to maintain uniformity of the density of the bale across the axial length thereof, or to correct for non-uniformity in the density of the bale across the axial length thereof.

Preferably, the output signal indicative of the direction of travel along which the baler should travel to correct a non-uniformity of the density of the bale across the axial length of the bale is outputted in response to the detection of non-uniformity of the density of the bale.

In another embodiment of the invention the output signal is adaptable to produce a human sensory perceptible signal.

In one embodiment of the invention the method comprises presenting the human sensory perceptible signal derived from the output signal to a driver operating the baler or operating a prime mover towing the baler. Preferably, the human sensory perceptible signal is indicative of the one of the uniformity and the non-uniformity of the bale across the axial length thereof. Advantageously, the human sensory perceptible signal is indicative of the degree of non-uniformity of the bale across the axial length thereof. Preferably, the human sensory perceptible signal is indicative of the axial end of the bale of greatest density.

In one embodiment of the invention the human sensory perceptible signal comprises an aurally perceptible signal.

In another embodiment of the invention the human sensory perceptible signal comprises a visually perceptible signal.

Preferably, the human sensory perceptible signal comprises both an aurally perceptible signal and a visually perceptible signal.

In another embodiment of the invention the output signal is configured for applying to the baler or to a prime mover towing the baler for controlling the direction of travel of the baler or the prime mover for one of maintaining the density of the bale across the axial length thereof uniform, and correcting for non-uniformity of the density of the bale across the axial length thereof.

Preferably, the output signal is adapted for applying to an electronic control unit of a prime mover towing the baler for controlling the direction of travel of the prime mover for one of maintaining the density of the bale across the axial length thereof uniform, and correcting for non-uniformity of the density of the bale across the axial length thereof.

Additionally, the invention provides apparatus for determining uniformity of the density of a round bale across the axial length thereof during formation of the bale by a baler, the baler comprising a first part and a second part comprising a pressing means defining a bale chamber and for rotating and pressing the bale in the bale chamber during formation of the bale, the second part being moveable relative to the first part between a closed state with the pressing means operable to rotate and press the bale, and an open state for discharging the bale from the bale chamber, and two retaining devices for releasably retaining the second part in the closed state, the retaining devices being spaced apart from each other in a direction parallel to the axial direction of the bale chamber, the apparatus comprising a monitoring means for monitoring a characteristic indicative of the force induced in each of the retaining devices retaining the second part in the closed state and for producing signals indicative of the monitored characteristics indicative of the forces induced in the respective retaining devices, and a signal processor configured to read the signals produced by the monitoring means indicative of the monitored characteristics indicative of the forces induced in the respective retaining devices, and to determine the uniformity of the density of the bale across the axial length thereof in response to the signals read from the monitoring means as a function of the monitored characteristics indicative of the forces induced in the respective retaining devices.

In one embodiment of the invention the signal processor is configured to determine the uniformity of the density of the bale across the axial length thereof as a function of the difference of the monitored characteristics indicative of the forces induced in the respective retaining devices.

Preferably, the signal processor is configured to determine the degree of uniformity of the density of the bale across the axial length thereof as a function of the difference of the monitored characteristics indicative of the forces induced in the respective retaining devices.

Advantageously, the signal processor is configured to determine the axial end of the bale towards which the density thereof is greatest in response to the density of the bale across the axial length thereof being non-uniform.

Preferably, the signal processor is configured to determine the axial end of the bale of greatest density as being the axial end of the bale towards the one of the retaining devices, the monitored characteristic indicative of the force induced therein is indicative of the greater of the forces induced in the respective retaining devices.

In one embodiment of the invention the monitoring means comprises two sensing means, each sensing means being configured to monitor the characteristic indicative of the force induced in a corresponding one of the retaining devices, and to produce the signal indicative of the characteristic indicative of the force induced in the corresponding retaining device.

In another embodiment of the invention each retaining device of the baler comprises a latch coupled to one of the first and second parts of the baler, and a receiver coupled to the other one of the first and second parts thereof, the latch being releasably engageable with the receiver for releasably retaining the second part of the baler in the closed state, and preferably, each sensing means is configured to monitor a characteristic indicative of the force induced in the one of the latch and the receiver of the corresponding one of the retaining devices when the latch is engaged with the receiver of the corresponding retaining device.

Preferably, each sensing means is configured to monitor a characteristic indicative of the force induced in the receiver of the corresponding retaining device.

In another embodiment of the invention the receiver of each retaining device comprises a latch pin extending from the one of the first and second parts of the baler, and preferably, the latch pin of each retaining device extends between a proximal end and a distal end, and advantageously, the latch pin is secured to the one of the first and second parts of the baler adjacent the proximal end thereof and projects therefrom to the distal end, and ideally, each sensing means is configured to monitor a characteristic indicative of the deflection of the latch pin of the corresponding retaining device at a location spaced apart from the proximal end thereof when engaged by the corresponding latch.

Preferably, a connecting system is provided corresponding to each retaining device, each connecting system extending between and connecting the latch pin of the corresponding retaining device at a location adjacent which the deflection of the latch pin is to be monitored, to a corresponding anchor location on the one of the first and second parts of the baler from which that latch pin extends spaced apart from that latch pin.

In one embodiment of the invention each sensing means is configured to monitor a characteristic indicative of the force induced in the connecting system of the corresponding retaining device in response to the deflection of the corresponding latch pin adjacent the location at which the deflection thereof is to be monitored.

Preferably, each connecting system is connected to the latch pin of the corresponding retaining device adjacent the distal end of the latch pin.

Preferably, each sensing means is co-operable with the corresponding connecting system for monitoring the characteristic indicative of the deflection of the latch pin of the corresponding retaining device.

Advantageously, each connecting system is connected to the latch pin of the corresponding retaining device and to the corresponding anchor location in the one of the first and second parts of the baler through the corresponding sensing means.

In one embodiment of the invention each connecting system comprises a pair of connecting members connected together through the corresponding sensing means.

Preferably, one of the connecting members of each connecting system is connected to the latch pin of the corresponding retaining device and the other one of the connecting members is connected to the corresponding anchor location in the corresponding one of the first and second parts of the baler.

Advantageously, each sensing means comprises one of a load sensor and a strain sensor.

In one embodiment of the invention the signal processor is configured to determine the degree of non-uniformity of the density of the bale across the axial length thereof as a function of the monitored characteristics indicative of the forces induced in the respective retaining devices.

In another embodiment of the invention the signal processor is configured to produce an output signal, the output signal comprising a signal indicative of the uniformity of the density of the bale across the axial length thereof.

In one embodiment of the invention the output signal produced by the signal processor comprises a signal indicative of the non-uniformity of the density of the bale across the axial length thereof.

Preferably, the output signal produced by the signal processor comprises a signal indicative of the densities of the bale adjacent the respective axial opposite ends thereof.

Advantageously, the output signal produced by the signal processor comprises a signal indicative of the axial end of the bale the density of which is greatest.

In one embodiment of the invention the output signal produced by the signal processor comprises a signal indicative of the direction of travel, or a change in the direction of travel of the baler required to maintain the density of the bale uniform across the axial length thereof, or to correct for non-uniformity of the density of the bale across the axial length thereof.

In another embodiment of the invention the output signal produced by the signal processor is adaptable to produce a human sensory perceptible signal.

Preferably, the human sensory perceptible signal is adapted to produce an indication of the one of the uniformity and the non-uniformity of the bale across the axial length thereof.

Advantageously, the human sensory perceptible signal is adapted to produce an indication of the degree of non-uniformity of the bale across the axial length thereof.

Preferably, the human sensory perceptible signal is adapted to produce an indication of the axial end of the bale of greatest density.

In one embodiment of the invention the human sensory perceptible signal comprises a visually perceptible signal.

In another embodiment of the invention the human sensory perceptible signal comprises an aurally perceptible signal.

Preferably, the human sensory perceptible signal comprises both a visually perceptible signal and an aurally perceptible signal.

In another embodiment of the invention the output signal produced by the signal processor is adapted for applying to a visual display device to produce an image for display on a visual display screen indicative of the direction of travel, or the change in direction of travel of the baler required to maintain the density of the bale across the axial length thereof uniform, or to correct for non-uniformity of the density of the bale across the axial length thereof.

In another embodiment of the invention the output signal produced by the signal processor is adapted for applying to a visual display device to produce an image on a visual display screen of the visual display device indicative of the degree of change of direction of the baler in order to correct for non-uniformity of the density of the bale across the axial length thereof.

Preferably, the output signal produced by the signal processor is adapted for applying to a visual display device in a cab of a prime mover towing the baler.

In another embodiment of the invention the output signal produced by the signal processor comprises a control signal for applying to the baler or to a prime mover towing the baler to control the direction of travel of the baler or the prime mover for maintaining the density of the bale across the axial length thereof uniform, or for correcting for non-uniformity of the density of the bale across the axial length thereof.

Preferably, the control signal of the output signal produced by the signal processor is adapted for applying to a steering system of the baler or a steering system of the prime mover.

Advantageously, the control signal of the output signal produced by the signal processor is adapted for applying to an electronic control unit of the baler or the prime mover.

The invention also provides a baler comprising the apparatus according to the invention for determining the uniformity of density of a bale being formed by the baler across the axial length of the bale.

Further, the invention provides a baler comprising a first part and a second part comprising a pressing means defining a bale chamber and for rotating and pressing a round bale during formation thereof in the bale chamber, the second part being moveable relative to the first part and being operable between a closed state with the pressing means operable to rotate and press a bale, and an open state for discharging the bale from the bale chamber, two retaining devices for releasably retaining the second part of the baler in the closed state, the retaining devices being spaced apart from each other in a direction parallel to the axial direction of the bale chamber, a monitoring means for monitoring a characteristic indicative of the force induced in each of the retaining devices retaining the second part in the closed state, and for producing signals indicative of the monitored characteristics indicative of the forces induced in the respective retaining devices, and a signal processor configured to read the signals produced by the monitoring means indicative of the monitored characteristics indicative of the forces induced in the respective retaining devices, and to determine uniformity of the density of the bale across the axial length thereof in response to the signals read from the monitoring means as a function of the monitored characteristics indicative of the forces induced in the respective retaining devices.

Further the invention provides a combination of a prime mover and a baler according to the invention coupled to the prime mover for towing thereof, the prime mover comprising an electronic control unit adapted to control the steering of the prime mover, the signal processor of the apparatus of the baler for determining the uniformity of the density of the bale across the axial length thereof during formation thereof in the baler being adapted to transmit the output signal therefrom to the electronic control unit, and the electronic control unit of the prime mover being responsive to the output signal received from the signal processor to operate the steering of the prime mover for controlling the direction of travel of the baler to maintain the density of a bale being formed in the baler uniform across the axial length of the bale or to correct for non-uniformity of the density of the bale across the axial length thereof.

Advantages of the Invention

The advantages of the invention are many. By providing the baler according to the invention with the apparatus which is also according to the invention for determining uniformity of the density of a round bale across the axial length thereof during formation of the bale in the baler, the baler according to the invention can be operated to produce bales of substantially uniform density across the axial length thereof. As each bale is being formed in the baler, the apparatus monitors the density of the bale towards the respective axial opposite ends of the bales, and on detecting a difference in the densities of the bale at the respective opposite ends thereof, the signal processor by outputting a signal indicative of the uniformity or non-uniformity of the density of the bale across the axial length thereof, appropriate corrective action can be taken in order to maintain the density of the bale uniform across the axial length thereof, or to correct for any such non-uniformity of the density of the bale across its axial length. When the signal processor is configured to produce an output signal indicative of the degree of non-uniformity of the density of the bale across the axial length thereof, the degree of corrective action required to correct for the non-uniformity of the density of the bale can be taken.

When the output signal produced by the signal processor is adapted for applying to a visual display device, a visual image can be displayed which is indicative of the direction of travel or a change in direction of travel of the baler required to maintain the density of the bale uniform across its axial length, or the change in direction of travel of the baler required in order to correct for non-uniformity of the density of the bale across the axial length thereof. This, thus, enables a person operating the baler to take appropriate action and to either maintain or appropriately alter the direction of travel of the baler required.

When the output signal produced by the signal processor is adapted for applying to a visual display device located in the cab of a prime mover, for example, in the cab of a tractor adapted for towing the baler, if a change of direction of the baler is required in order to correct for non-uniformity of the density of the bale across the axial length thereof, a driver of the prime mover can immediately take the appropriate corrective action. Furthermore, when the signal produced by the signal processor is indicative of the degree of non-uniformity of the bale across the axial length thereof, the degree of correction to the direction of travel of the baler required in order to correct for non-uniformity in the density of the bale across the axial length thereof, can be readily presented to the driver of the prime mover on a visual display screen of the visual display device in the cab of the prime mover.

Accordingly, as soon as non-uniformity in the density of a bale being produced by the baler is detected, appropriate corrective action can be taken, thereby minimising the degree of corrective action to be taken.

Another particularly important advantage of the invention is achieved when the output signal from the signal processor comprises a control signal adapted for applying directly to an electronic control unit of a prime mover, such as a tractor, which is towing the baler, and in which the electronic control unit of the prime mover is adapted to control the steering of the prime mover, and the control signal is adapted to operate the electronic control unit of the prime mover to steer the prime mover. By adapting the electronic control unit of the prime mover to be responsive to the control signal from the signal processor to control the steering of the prime mover, any non-uniformity in the density of a bale being formed in the baler across the axial length of the bale is automatically corrected by appropriate operation of the steering system of the prime mover in response to the control signal from the signal processor, without any intervention required by the driver of the prime mover.

A further advantage of the invention is that by maintaining the density of a bale being formed in the baler uniform across the axial length of the bale, there is little or no danger of the belts of the baler, which define the bale chamber, rotate, form and press the bale, being offset transversely, which otherwise would result in the event of the density of a bale being formed in the baler being non-uniform across the axial length of the bale. Thus, by avoiding offsetting of the belts transversely, the need for retracking of the belts of the baler should not arise. A further advantage of maintaining the density of a bale being formed in the baler uniform across the axial length of the bale is that the life of the belts is significantly increased, and any wear on the belts is uniform.

Another advantage of the invention is that by producing bales of uniform density across the axial lengths of the bales, bales of uniform density across their axial length are easier and safer to handle, and in particular, are more easily and safely stored, particularly where the bales are being stacked in layers one on top of the other.

The advantages achieved by the apparatus according to the invention are similar to those achieved by the baler, and furthermore, the advantages achieved by the method according to the invention are also similar to those achieved by the baler, as are the advantages achieved by the combination according to the invention of a prime mover and the baler also similar.

BRIEF DESCRIPTION OF THE DRAWINGS

The invention will be more clearly understood from the following description of a preferred embodiment thereof which is given by way of example only with reference to the accompanying drawings, in which.

DETAILED DESCRIPTION OF THE INVENTION

Figure 1:
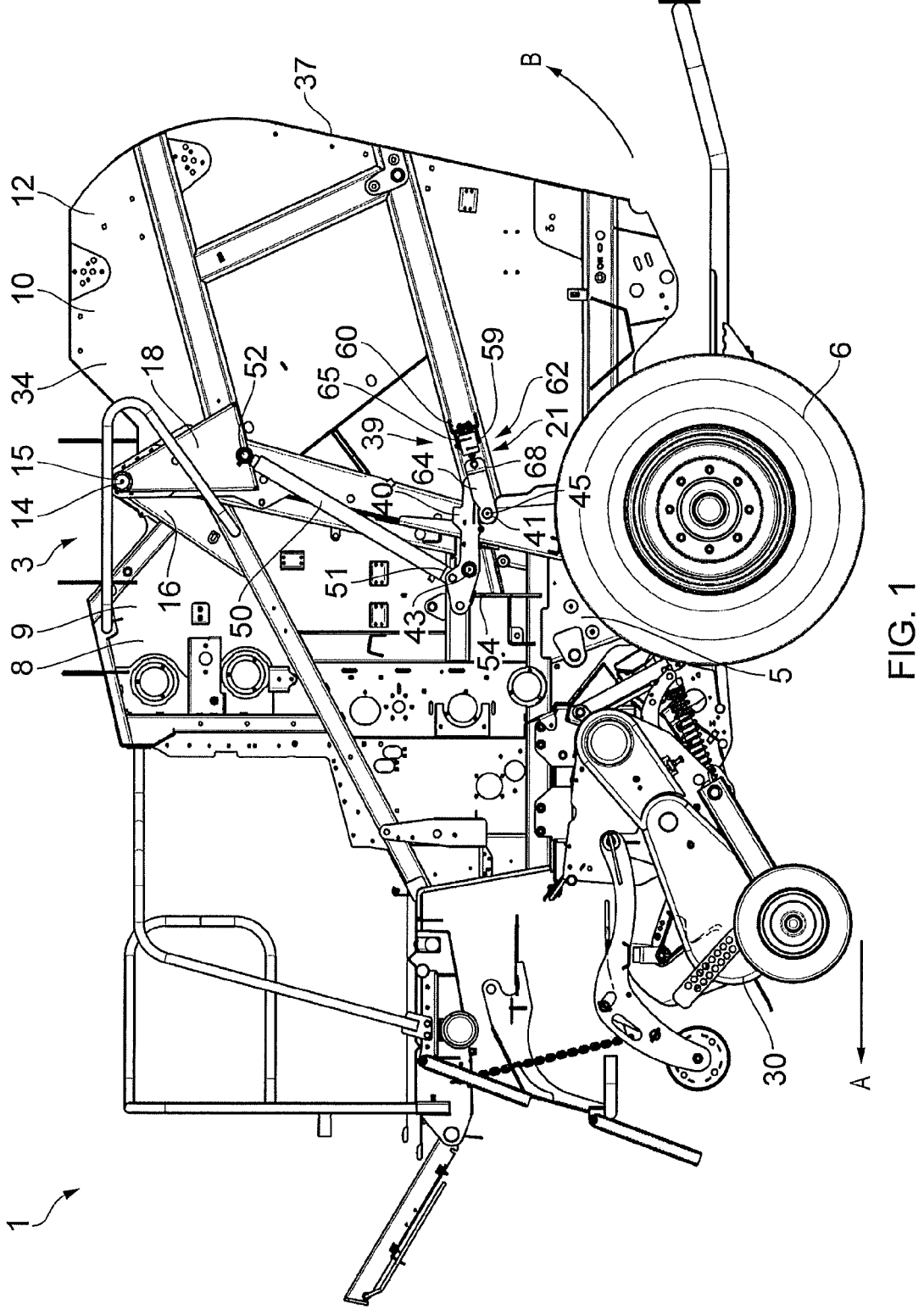
FIG. 1 is a side elevational view of the left-hand side of a baler according to the invention comprising a portion of apparatus also according to the invention for determining uniformity of the density of a round bale across the axial length of the bale during formation of the bale by the baler.
Figure 2:
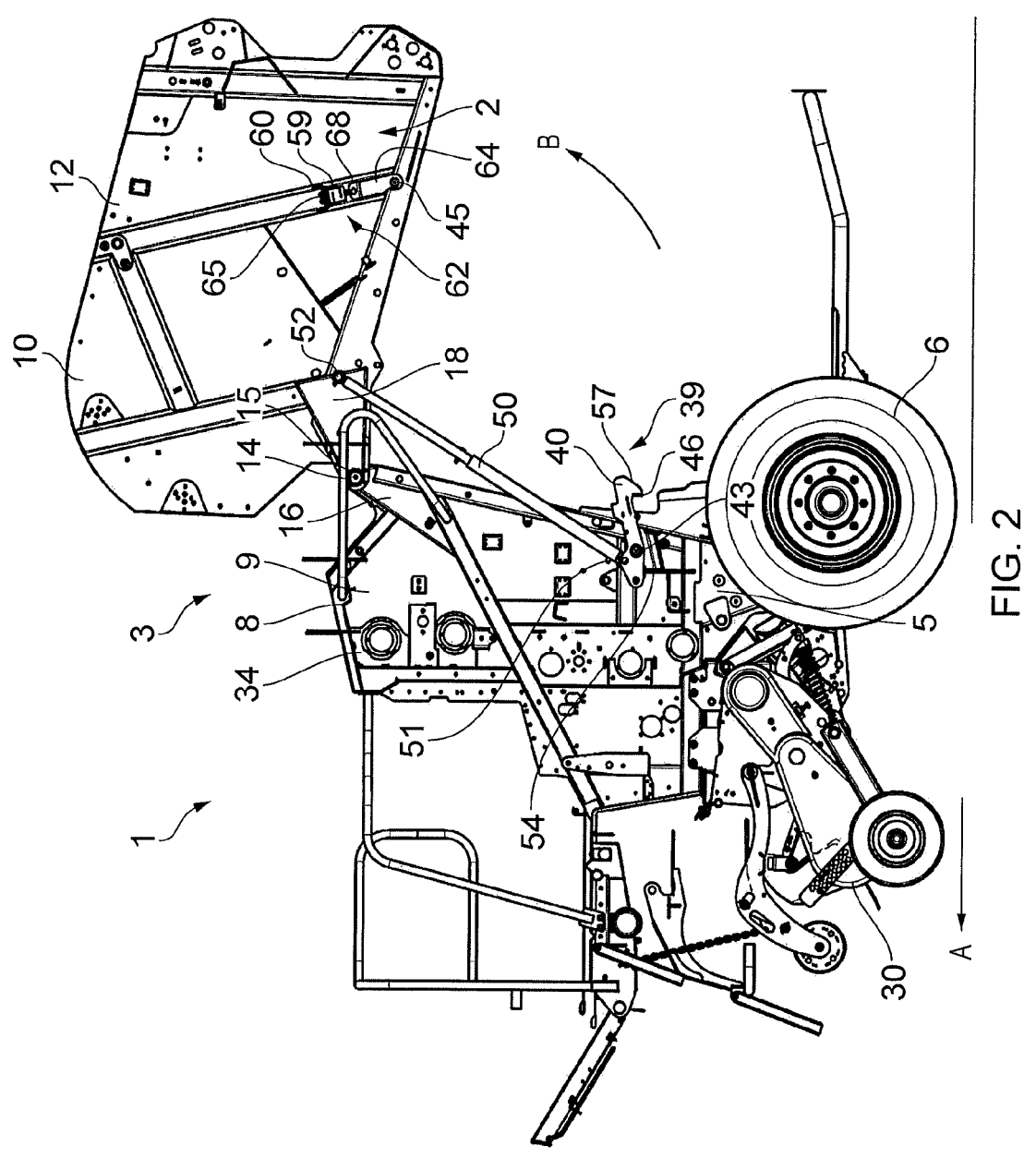
FIG. 2 is a view similar to FIG. 1 of the baler of FIG. 1 but on a smaller scale to that of FIG. 1, and with a portion of the baler in a different state to that of FIG. 1.
Figure 3:
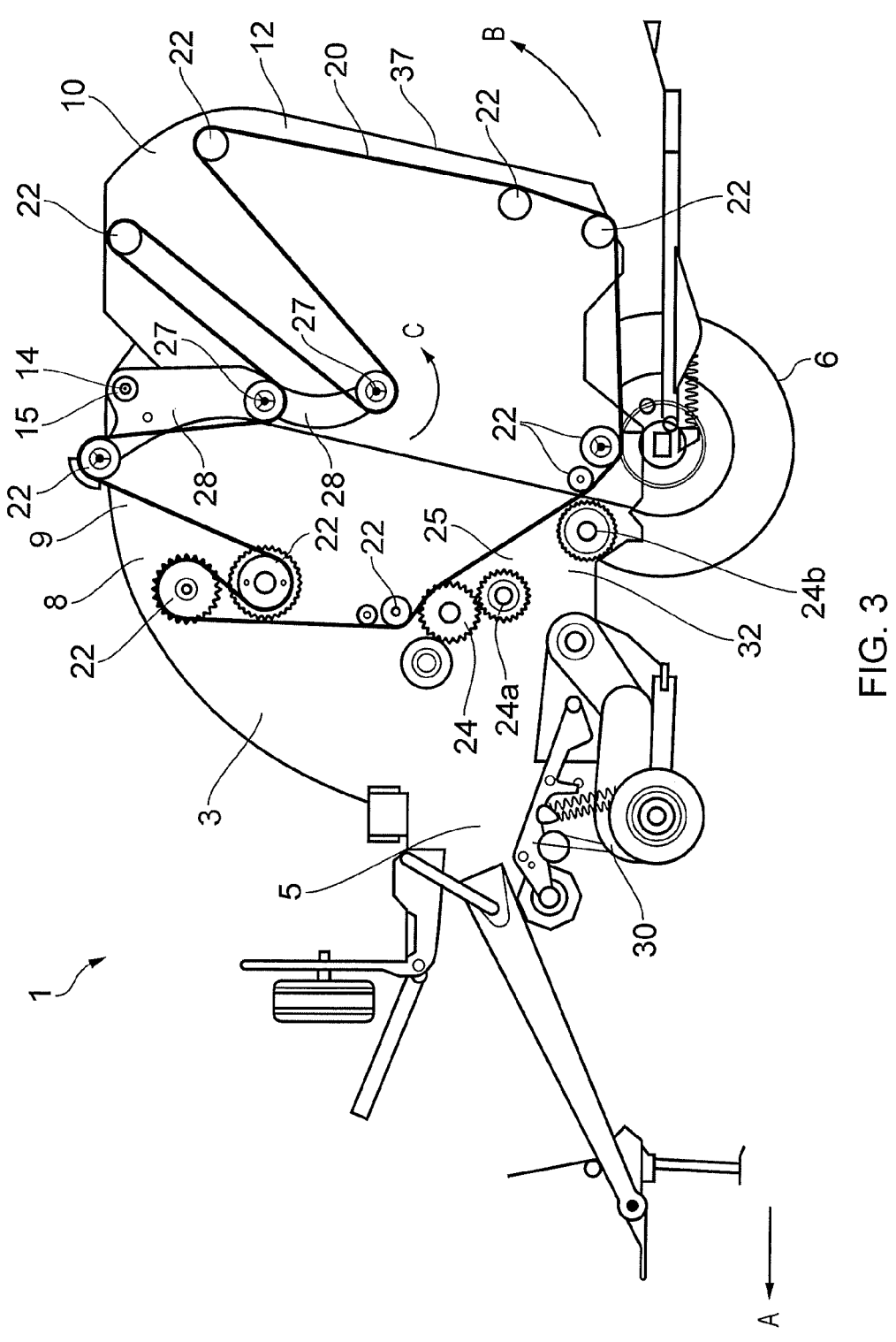
FIG. 3 is a cross-sectional side elevational view of the baler of FIG. 1.

Referring to the drawings, and initially to FIGS. 1 to 9 thereof, there is illustrated a baler according to the invention indicated generally by the reference numeral 1 for producing round bales of crop material, for example, round bales of silage. In this embodiment of the invention the baler 1 comprises a belt baler of the type which will be well known to those skilled in the art, and only those parts of the baler 1 which are relevant to the invention will be described. The baler 1 is suitable for being towed by a prime mover, for example, a tractor (not shown) in a normal conventional manner in the direction of the arrow A for picking up crop material lying on a field in the form of an elongated sward of the crop material for baling thereof. The baler 1 comprises apparatus also according to the invention indicated generally by the reference numeral 2, which will be described in detail below, for determining the uniformity of the density of a round bale across the axial length of the round bale as the bale is being formed, and for outputting a signal to a driver of the prime mover indicative of the direction of travel or a change in the direction of travel relative to the sward of crop material in which the baler 1 should be towed by the prime mover, in order to maintain the density of the bale across the axial length thereof uniform, or to correct for any non-uniformity of the density of the bale across the axial length thereof, in the event of such non-uniformity being determined.

The baler 1 comprises a housing 3 which is carried on a chassis 5, which in turn is supported on a pair of ground engaging wheels 6 spaced apart transversely relative to the direction of normal forward travel of the baler 1. The housing 3 comprises a first part 8 which is rigidly mounted on the chassis 5 and comprises a pair of opposite transversely spaced apart first side walls 9 extending upwardly from the chassis 5, and a second part 10 comprising a pair of opposite transversely spaced apart second side walls 12. The second part 10 is pivotally coupled to the first part 8 about a main pivot axis 14 extending transversely relative to the direction of normal forward travel of the baler 1, and is pivotal about the main pivot axis 14 in the direction of the arrow B in a generally rearwardly upwardly direction from a closed state illustrated in FIG. 1 during which a round bale is formed by the baler 1 to an open state illustrated in FIG. 2 for discharge of a formed bale from the baler 1. A pair of spaced apart pivot shafts 15 are carried on corresponding first carrier brackets 16 extending from the respective first side walls 9 of the first part 8 of the housing 3. Second carrier brackets 18 extending upwardly from the respective second side walls 12 of the second part 10 of the housing 3 pivotally engage the pivot shafts 15. The first carrier brackets 16 are configured so that the pivot shafts 15 are aligned with each other and define the main pivot axis 14.

A pressing means for rotating, forming and pressing the crop material to form a bale comprises a plurality of belts 20 located in the first and second parts 8 and 10 of the baler 1. The belts 20 are carried on carrier rollers 22 extending between and rotatably mounted in the first side walls 9 of the first part 8 and in the second side walls 12 of the second part 10. The belts 20 are transversely spaced apart along the carrier rollers 22 with a relatively small gap between adjacent ones of the belts 20. The belts 20 define with bale rotating rollers 24 a variable diameter bale chamber 25, which increases in diameter as crop material is progressively fed into the bale chamber 25 and the diameter of the bale being formed therein increases. The bale rotating rollers 24 extend between and are rotatably mounted in the first side walls 9 of the first part 8 of the baler 1. The bale rotating rollers 24 are rotatably driven, and some of the carrier rollers 22 are also rotatably driven for driving the belts 20, so that the rotating action of the bale rotating rollers 24 and the driving of the belts 20 act to rotate the crop material as it is being fed into the bale chamber 25 for forming and rotating the bale about a central rotational axis defined by the bale chamber 25 extending parallel to the main pivot axis 14. Tensioning rollers 27 extend between and are rotatably carried on a pair of spaced apart tensioning arms 28, which in turn are pivotally carried on the pivot shafts 15 about the main pivot axis 14. Tensioning springs (not shown) tension the tensioning arms 28 for in turn tensioning the belts 20 for applying pressure to the rotating crop material in the bale chamber 25 as the bale is being formed.

A pick-up mechanism 30 picks up the crop material form the sward thereof, as the baler 1 is towed along the sward of the crop material. The crop material is fed in an known manner from the pick-up mechanism 30 into the bale chamber 25 through a transversely extending crop inlet 32 defined between two of the bale rotating rollers 24, namely, the bale rotating rollers 24a and 24b.

Accordingly, as the bale chamber 25 increases in diameter as a result of the crop material being progressively fed into the bale chamber 25, the tensioning arms 28 pivot in the direction of the arrow C against the action of the tensioning springs (not shown) to thereby allow the belts 20 to form the bale chamber 25 of increasing diameter, and also to maintain pressure on the belts to in turn apply pressure to the crop material for pressing the crop material in the bale chamber 25 as the bale is being formed and rotated.

Belt balers such as the baler 1 will be well known to those skilled in the art, and further description should not be required.

However, it will be understood that instead of a plurality of transversely spaced apart belts 20, a single belt may be provided. Furthermore, in other embodiments of the invention two separate belts may be provided and configured so that the bale chamber would be defined between the two belts, and the belts would be configured in the first part 8 and the second part 10 of the housing 3, so that the rotational axis about which the bale would be rotated during formation in the bale chamber would extend transversely of the baler 1 and parallel to the main pivot axis 14. Additionally, in other embodiments of the invention, the baler may be a fixed chamber baler, in which case the bale chamber would be defined by a plurality of transversely extending bale rotating rollers located in the first and second parts 8 and 10 of the housing 3, with the bale rotating rollers being circumferentially spaced apart around the periphery of the bale chamber. Such arrangements of belts and bale rotating rollers of belt balers and fixed chamber balers will be well known to those skilled in the art, and further description should not be required.

Figure 4:
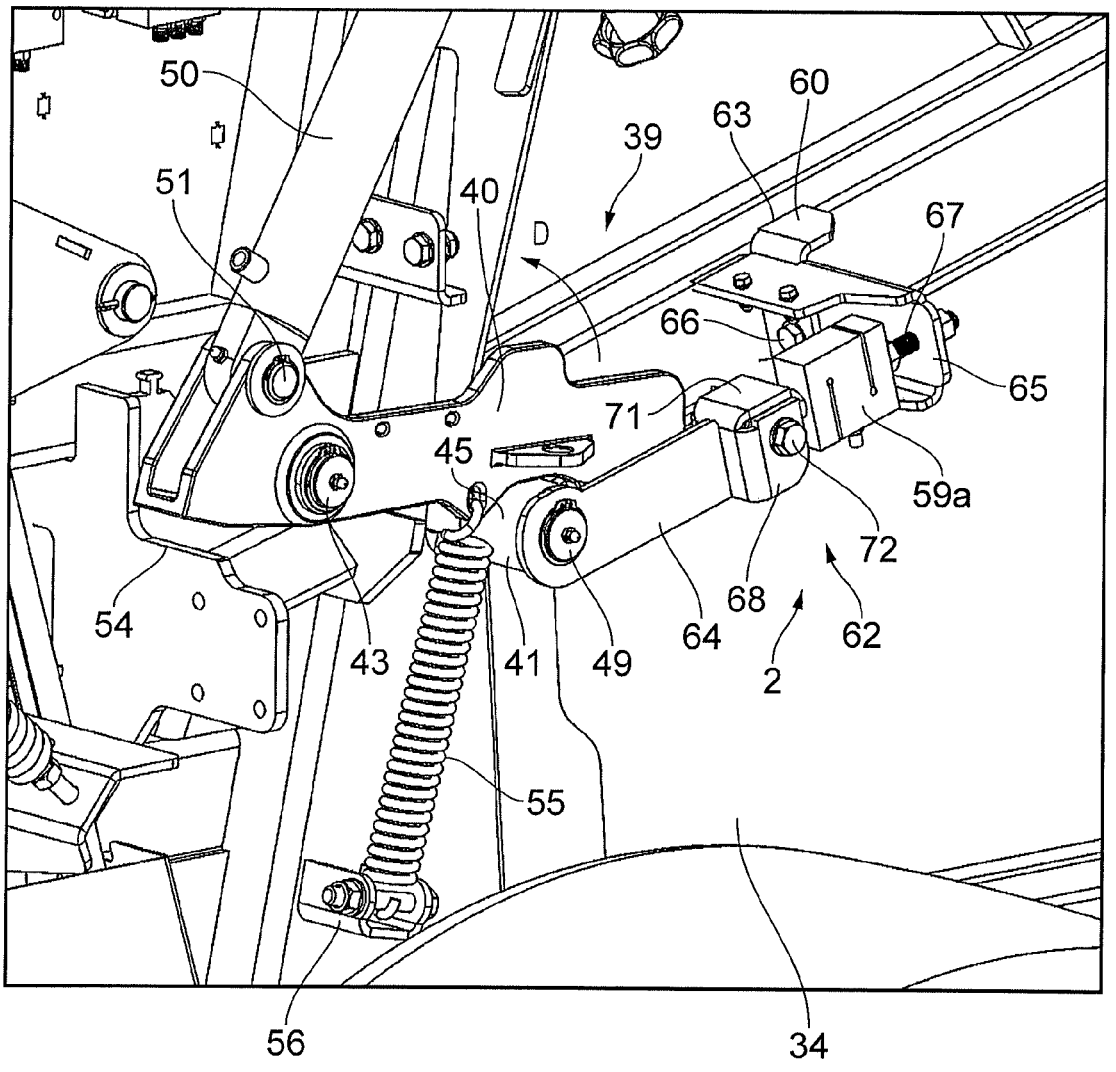
FIG. 4 is an enlarged perspective view of a portion of the left-hand side of the baler of FIG. 1 illustrating a detail of the apparatus of FIG. 1.
Figure 5:
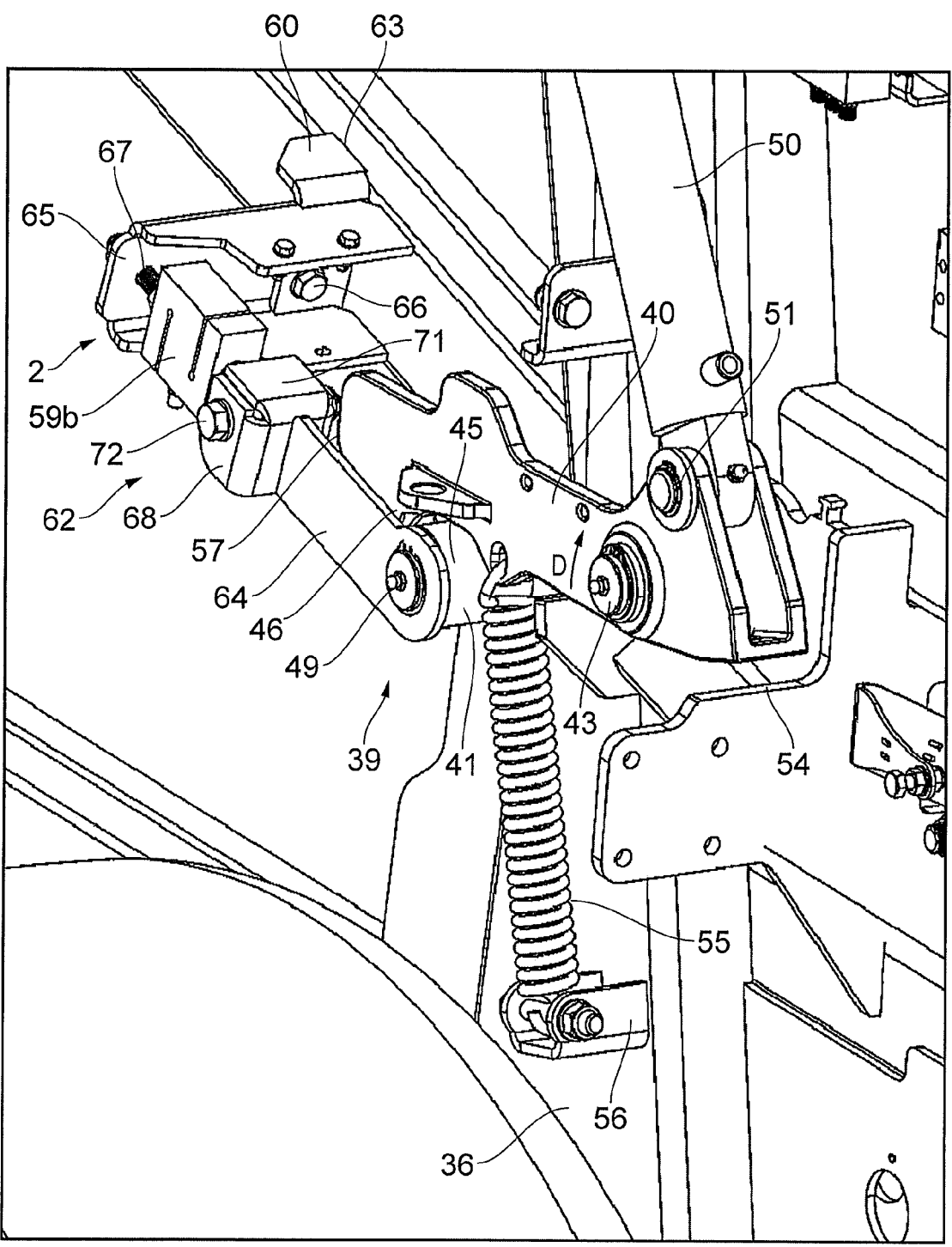
FIG. 5 is an enlarged perspective view of a portion of the right-hand side of the baler of FIG. 1 illustrating another detail of the apparatus of FIG. 1.

The baler 1 can be considered as having a left-hand side 34 and a right-hand side 36, and when viewed from the rear 37 looking forward in the direction of the arrow A, the left-hand side 34 of the baler 1 is the side of the baler 1 which is visible in FIGS. 1, 2, 4, 6 and 7, and the right-hand side 36 of the baler 1 is the side of the baler 1 a part only of which is illustrated in FIG. 5. Accordingly, when it is necessary to distinguish between components on the left-hand side 34 and those on the right-hand side 36 of the baler 1, the components on the left-hand side 34 will be identified by the reference letter "a" following the reference numeral identifying the component, and those components on the right-hand side 36 will be identified by the reference letter "b" following the reference numeral identifying the component.

Two retaining devices 39, each comprising a latch 40 and a receiver 41 are provided on the respective opposite left-hand and right-hand sides 34 and 36 of the baler 1 for retaining the second part 10 of the housing 3 in the closed state against the pressure being applied to the bale as the bale is being formed in the bale chamber 25 of the baler 1. Each latch 40 is pivotally coupled to the corresponding one of the first side walls 9 of the first parts 8 of the housing 3 about a pivot shaft 43 extending perpendicularly and sidewardly outwardly from the corresponding first side wall 9. The receiver 41 of each retaining device 39 comprises a latch pin 45 extending perpendicularly and sidewardly outwardly from the corresponding one of the second side walls 12 of the second part 10 of the housing 3, which is engaged by an engagement lug 46 of the corresponding latch 40 for retaining the second part 10 of the housing 3 in the closed state. Each latch pin 45 extends between a proximal end 48 and a distal end 42. Each latch pin 45 is secured to the corresponding second side wall 12 of the second part 10 adjacent its proximal end 48, and extends sidewardly outwardly from the corresponding second side wall 12 to the distal end 49 thereof.

Figure 6:
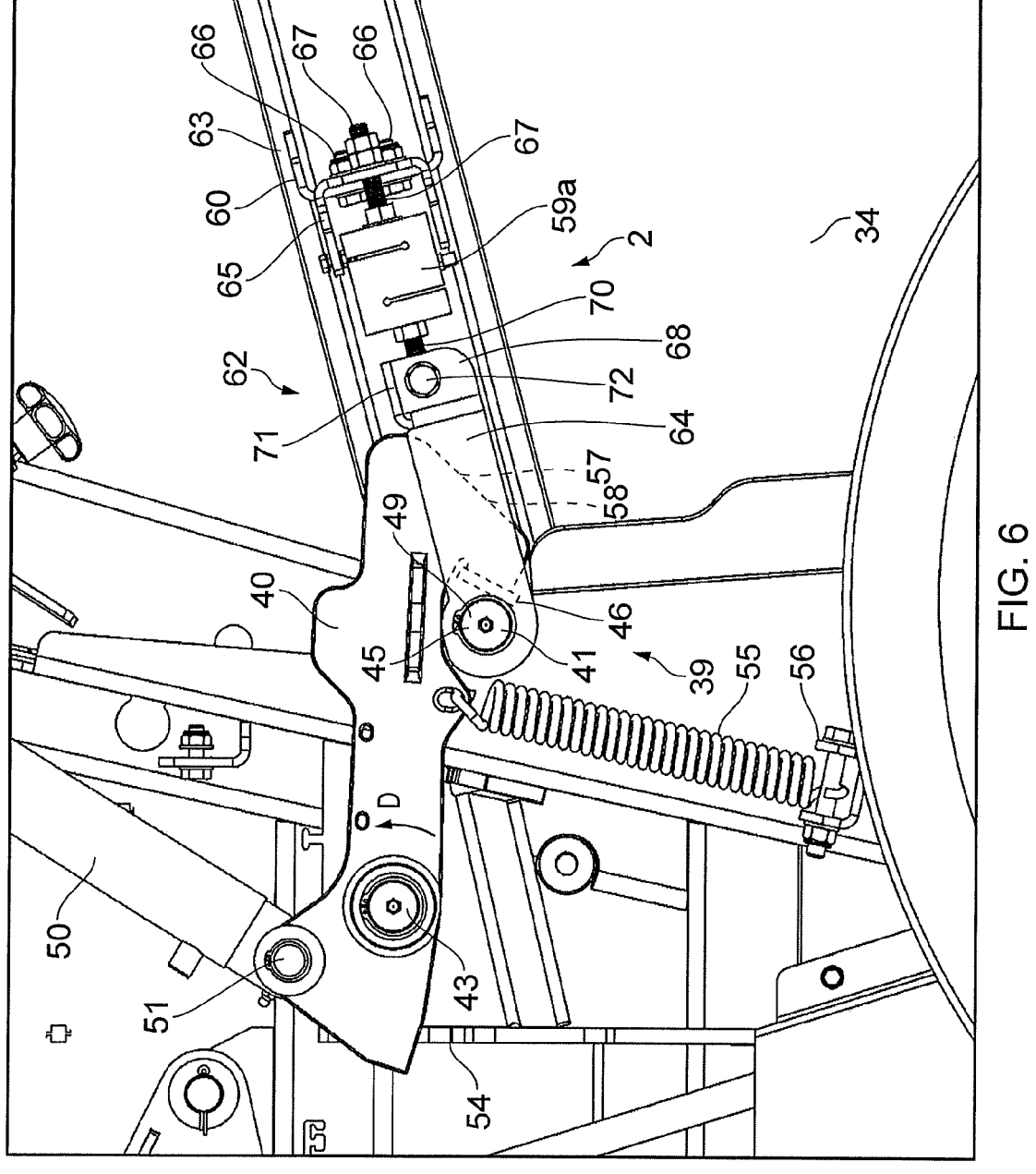
FIG. 6 is an enlarged side elevational view of the portion of FIG. 4 of the left-hand side of the baler of FIG. 1 illustrating the detail of FIG. 3 in the state of FIG. 4.
Figure 7:
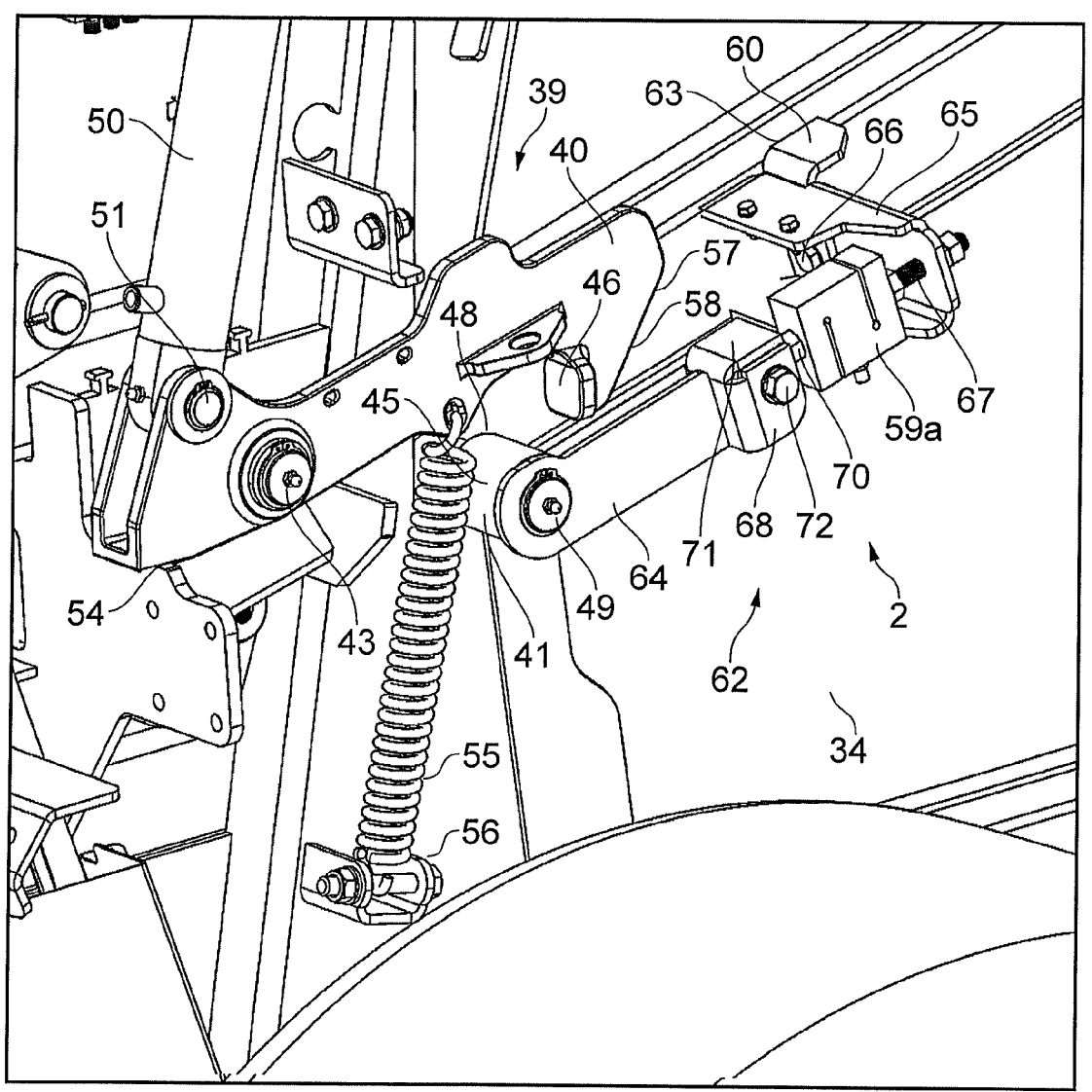
FIG. 7 is an enlarged perspective view of the portion of FIG. 4 of the left-hand side of the baler of FIG. 1 illustrating the detail of FIG. 4 in a different state to that of FIG. 4.

Two hydraulic rams 50 are provided for operating the respective latches 40 between a latched state illustrated in FIGS. 4 to 6 and a release state illustrated in FIG. 7, and also for operating the second part 10 of the housing 3 between the closed state and the open state. Each hydraulic ram 50 extends between the corresponding latch 40 and the corresponding second side wall 12 of the second part 10, and is connected to the corresponding latch 40 at 51 and to the corresponding second side wall 12 of the second part 10 of the housing 3 at 52. Initially on being extended the rams 50 operate the corresponding latches 40 from the latched state illustrated in FIGS. 4 to 6 with the engagement lugs 46 of the latches 40 engaging the corresponding latch pins 45, to the release state illustrated in FIG. 7 with the engagement lugs 46 disengaged from the latch pins 45 to permit pivoting of the second part 10 of the housing 3 from the closed state to the open state. Further extension of the rams 50 urges the second part 10 of the housing 3 from the closed state to the open state for discharge of a bale from the baler. An abutment bracket 54 extending sidewardly outwardly from each first side wall 9 of the first part 8 of the housing 3 is engageable with the corresponding latch 40 when the latch 40 is in the release state, thereby preventing further movement of the latches 40 from the latched state beyond the release state, so that the further extension of the two rams 50 when the latches 40 have been urged into the release state results in the second part 10 of the housing 3 being pivoted about the main pivot axis 14 from the closed state to the open state for discharge of a formed bale from the bale chamber 25. Tension springs 55 acting between the respective latches 40 and anchor mountings 56 rigidly mounted on the corresponding first side walls 9 of the first part 8 are configured to urge the corresponding latches 40 into the latched state, and to retain the latches 40 in the latched state, until they are urged therefrom by the rams 50.

A leading edge 57 of each latch 40 is angled at 58 to engage and accommodate the corresponding latch pin 45 past the angled leading edge 57 thereof into engagement with the engagement lug 46 as the second part 10 of the housing 3 is being urged into the closed state.

Balers of the type of the baler 1 as described up to this point will be well known to those skilled in the art, and further description of the baler and its operation should not be required.

Turning now to the apparatus 2 for determining the uniformity of the density of a bale being formed in the baler 1 across the axial length of the bale, the apparatus 2 in particular is configured to detect non-uniformity of the density of the bale across the axial length of the bale as the bale is being formed in the bale chamber 25. Such non-uniformity of a bale across its axial length, typically would result if the sward of crop material being picked up by the pick-up mechanism 30 is narrower than the width of the pick-up mechanism 30, and in turn narrower than the axial length of the bale chamber 25, or if the density of the sward of crop material increases transversely across the sward from one side of the sward to the other, or if the pick-up mechanism 30 of the baler 1 is not properly aligned with the sward. The apparatus 2 comprises a monitoring means for monitoring a characteristic indicative of the force induced in each of the retaining devices 39 resulting from the pressure being applied to the bale during formation thereof in the bale chamber 25. In this embodiment of the invention the monitoring means comprises a pair of load sensors 59, each of which is configured to monitor a characteristic indicative of the force induced in a corresponding one of the retaining devices 39. In this case, the characteristic monitored by each load sensor 59 is a characteristic which is indicative of the deflection of the distal end 49 of the corresponding latch pin 45, which is proportional to the force induced in the corresponding retaining device 39 by the latch 40 engaging the corresponding latch pin 45.

Each load sensor 59 is connected to and between the distal end 49 of the corresponding latch pin 45 and a corresponding anchor bracket 60 rigidly secured to the corresponding second side wall 12 of the second part 10 of the housing 3 by a corresponding connecting system 62. The anchor brackets 60 are welded to the respective second side walls 12 of the second part 10 of the housing 3 at respective anchor locations 63 which are spaced apart from the corresponding latch pins 45.

Each connecting system 62 comprises a first connecting member 64, which is connected to the distal end 49 of the corresponding latch pin 45, and a second connecting member 65 which is rigidly connected to the corresponding anchor bracket 60, by nut and bolt fasteners 66. A first connecting screw 67 extending from each load sensor 59 secures the load sensor to the corresponding second connecting member 65. Each first connecting member 64 terminates in a U-bracket 68 for coupling the first connecting member 64 to the load sensor 59. A second connecting screw 70 extending from the load sensor 59 terminates in an eye member 71. A spindle 72 carried in the U-bracket 68 of the first connecting member 64 engages the eye member 71 of the second connecting screw 70 extending from the load sensor 59 for coupling the first connecting member 64 to the load sensor 59. Accordingly, the force induced in the first and second connecting members 64 and 65 of each connecting system 62 resulting from deflection of the distal end 49 of the corresponding latch pin 45 is monitored by the corresponding load sensor 59, and each load sensor 59 produces a signal indicative of the deflection of the distal end 49 of the corresponding latch pin 45, which in turn is indicative of the force induced in the corresponding retaining device 39.

The apparatus 2 for determining the uniformity of the density of the bale across the axial length thereof also comprises a signal processor configured to read the signals outputted by the two load sensors 59. In this embodiment of the invention the signal processor comprises a microprocessor 75, although any other suitable signal processor may be used. In some embodiments of the invention a signal processor of the baler may be used instead of a dedicated signal processor for the apparatus 2. In which case the signal processor of the baler would be appropriately configured and programmed. The microprocessor 75 is programmed to compute values indicative of the forces induced in the respective retaining devices 39 from the signals read from the respective load sensors 59, and to compute the difference between the two forces. If the difference between the two forces induced in the respective retaining devices 39 is determined as being zero, in other words, the two forces induced in the respective retaining devices 39 are equal to each other, the microprocessor 75 determines that the density of the bale being formed in the bale chamber is substantially uniform across the axial length of the bale.

On the other hand, if the microprocessor 75 determines that the forces induced in the respective retaining devices 39 are different, in other words, the difference between the two forces is greater than zero, the microprocessor 75 determines that the density of the bale is non-uniform across the axial length of the bale being formed. The degree of non-uniformity is determined by the microprocessor 75 from the difference of the two forces induced in the respective retaining devices 39. The greater the difference between the two forces induced in the respective retaining devices 39, the greater will be the degree of non-uniformity of the density of the bale across the axial length thereof.

The microprocessor 75 is also programmed to determine the axial end of the bale towards which the density is greatest by determining which of the forces induced in the respective retaining devices 39 is the greater of the two. The axial end of the bale adjacent the one of the first side wall 9 of the first part 8 of the housing 3, which corresponds to the retaining device 39, in which the induced force therein is the greater of the two forces, is determined by the microprocessor 75 as being the axial end of the bale towards which the density thereof is the greatest.

The microprocessor 75 is further programmed to produce an output signal for relaying to the cab of the prime mover, to which the baler 1 is attached for towing, to provide a human sensory perceptible signal to the driver of the prime mover indicative of the direction of travel or the change in direction of travel of the baler 1 required to maintain uniformity of the density of the bale across the axial length thereof, or to correct for a non-uniformity of the density of the bale across the axial length thereof. The output signal produced by the microprocessor 75 indicative of the direction of travel or a change in the direction of travel required to be taken by the baler 1 is indicative of the direction of travel or the change in the direction of travel of the baler 1 relative to the sward of crop material being picked up by the pick-up mechanism 30. In this embodiment of the invention the output signal produced by the microprocessor 75 is configured for applying to a visual display device 77 which is located in the cab of the prime mover, such as a tractor, and is connected to the control system of the baler 1 for providing visual information to the driver of the prime mover regarding the operation of the baler 1 as the baler 1 is being towed along the sward of the crop material. Although the visual display device may be a dedicated visual display device specifically for use by the apparatus 2 only.

The output signal from the microprocessor 75 is configured for applying to the visual display device 77, and for being converted in the visual display device 77 into the human sensory perceptible signal, in this case an image for display on a screen 78 of the visual display device 77 in an area 79 of the screen 78. For so long as the microprocessor 75 determines that the density of the bale is uniform across the axial length of the bale, a central cross sign 80 only is displayed in the centre of the area 79 on the screen 78, and the remainder of the area 79 in sections 81 on opposite sides of the central cross sign 80 remains blank, indicating to the driver of the prime mover towing the baler 1 that the driver should continue straight ahead along the sward of crop material, since the crop material being picked up from the sward by the pick-up mechanism 30 of the baler 1 is resulting in the density of the bale across the axial length thereof being uniform, see the image of the area 79 on the screen 78 in FIG. 9*a*.

However, in the event that the microprocessor 75 determines that the density of the bale is greater towards the axial end thereof on the right-hand side 36 of the baler 1 than towards the axial end thereof adjacent the left-hand side 34 of the baler 1, in response to the force detected by the right-hand load sensor 59*b* being greater than the force detected by the left-hand load sensor 59*a* on the left-hand side 34 of the baler 1, one or more arrows 83*b* are displayed in the section 81*b* of the area 79 to the right-hand side of the central cross sign 80 indicating that the driver should steer to the right, relative to the sward of crop material, since either the majority of the sward is located to the right-hand side of the pick-up mechanism 30 of the baler 1, or the density of the crop material in the sward is greater on the right-hand side of the sward than on the left-hand side thereof. Thus, by steering the prime mover and in turn the baler 1 to the right relative to the sward, the denser part of the sward is picked up by the pick-up mechanism 30 towards the left-hand side thereof, in order to correct for the non-uniformity of the density of the bale across the axial length thereof.

On the other hand, should the microprocessor 75 detect that the density of the bale is greater towards the axial end thereof adjacent the left-hand side 34 of the baler 1 than towards the axial end thereof adjacent the right-hand side 36 of the baler 1, as a result of the force detected by the left-hand load sensor 59*a* being greater than the force detected by the right-hand load sensor 59*b*, the microprocessor 75 outputs the output signal to the visual display device 77, which in turn displays one or more arrows 83*a* in a section 81*a* of the area 79 of the screen 78 to the left-hand side of the central cross sign 80. This indicates to the driver of the prime mover that the prime mover and in turn the baler should be steered to the left relative to the sward, since either the sward is denser on the left-hand side thereof, or the majority of the sward is located towards the left-hand side of the pick-up mechanism 30. Thereby, by steering the baler 1 to the left relative to the sward, the denser part of the sward is picked up by the pick-up mechanism 30 towards the right-hand side thereof, thus increasing the density of the bale towards the axial end thereof adjacent the right-hand side 36 of the baler 1, in order to correct for the non-uniformity of the density of the bale across the axial length thereof.

The output signal from the microprocessor 75 is also configured to indicate the degree of the non-uniformity of the density of the bale across the axial length thereof. The degree of the non-uniformity of the density across the axial length of the bale is indicated by the number of the arrows 83 being displayed in the relevant section 81 of the area 79 on the screen 78. The number of arrows 81 displayed in the relevant section 81, which may be from one arrow 83 up to five arrows 83, indicates to the driver the degree of non-uniformity of the density of the bale across the axial length thereof. The greater the number of arrows 83 displayed in the relevant section 81 of the area 79 indicates the greater the degree of non-uniformity of the density of the bale across the axial length thereof. The number of arrows 83 displayed in the relevant section 81 of the area 79 also indicates to the driver the degree to which the prime mover should be steered to the left or the right relative to the sward in order to correct for the non-uniformity of the density of the bale across the axial length thereof. The greater the number of arrows 83 displayed in the relevant section 81 of the area 79 indicates the greater the degree of steering to the right or to the left, as the case may be, relative to the sward which is required.

Accordingly, as the non-uniformity of the density of the bale across the axial length thereof is being corrected, the number of arrows 83 displayed in the relevant section 81 of the area 79 of the screen 78 decreases until the density of the bale is substantially uniform across the axial length thereof, at which stage only the central cross sign 80 is displayed centrally in the area 79 on the screen 78, thereby indicating to the driver to steer straight ahead relative to the sward. While the section 81*a* and 81*b*, in which the arrows 83 are displayed, indicates to the driver the direction to which the baler 1 should be steered relative to the sward of crop material, the arrows 83 are also shaped to point in the direction to which the baler 1 should be steered relative to the sward.

In use, with the baler 1 hitched to a prime mover, for example, a tractor, and with the visual display device 77 located in the cab of the tractor in the line of sight of the driver, and connected to the control system of the baler 1 and to the microprocessor 75 of the apparatus 2, the baler 1 and the tractor is ready for use. With the second part 10 of the housing 3 of the baler 1 in the closed state, the baler 1 is towed forwardly by the tractor along the sward of the crop material to be baled. As the baler 1 is towed forwardly, the sward of crop material is progressively picked up by the pick-up mechanism 30, and delivered into the bale chamber 25 to be rotated and pressed by the belt or belts, as the case may be, to form the bale. The microprocessor 75 continuously reads the signals from the load sensors 59*a* and 59*b*, and for so long as the difference between the forces sensed by the respective load sensors 59 remains zero or approximately zero, the microprocessor 75 outputs the output signal to the visual display device 77 being indicative of the density of the bale across the axial length thereof being uniform, and the central cross sign 80 is displayed centrally in the area 79 of the visual display screen 78, thereby indicating to the driver to drive straight ahead relative to the sward.

However, on the difference between the forces monitored by the load sensors 59 being greater than zero, the microprocessor 75 determines that the density of the bale across the axial length thereof is non-uniform, and the degree of non-uniformity of the density is determined by the microprocessor 75 from the magnitude of the value of difference between the forces sensed by the load sensors 59. Additionally, the microprocessor 75 determines the axial end of the bale towards which the density is greater based on the load sensor 59 which indicates the greater of the two forces.

The microprocessor 75 then produces the output signal, which is indicative of the degree of non-uniformity of the density of the bale across the axial length thereof, and the axial end of the bale towards which the density thereof is greatest. The output signal from the microprocessor 75 is applied to the visual display device 77, which displays the degree of non-uniformity of the density of the bale across the axial length thereof by the number of arrows 83 displayed in the relevant section 81 of the area 79 of the screen 78. The axial end of the bale, towards which the density of the bale is greatest, is indicated by the section 81 of the area 79 in which the arrows 83 are displayed. The section 81 of the area 79 in which the arrows 83 are displayed also indicates the direction in which the tractor and in turn the baler 1 should be steered relative to the sward, as do the direction in which the arrows 83 point. The number of arrows 83 in the relevant section 81 as well as indicating the degree of non-uniformity of the density of the bale across the axial length thereof, also indicates to the driver the appropriate degree of steering of the tractor and in turn the baler 1 required to correct for the non-uniformity of the density of the bale across the axial length thereof.

The driver then takes the appropriate action in steering the tractor, and in turn the baler 1 based on the display in the area 79 of the display screen 78.

On completion of the formation of the bale the rams 50 are operated to release the latches 40 and to operate the second part 10 of the housing 3 from the closed state to the open state. The initial extension of the rams 50 operates the corresponding latches 40 from the latched state to the unlatched state by urging the latches 40 against the abutment bracket 54. Further extension of the rams 50 results in the second part 10 of the housing 3 being urged from the closed state to the open state in order to discharge the bale from the bale chamber 25 of the baler 1. On the bale being discharged, the rams 50 are retracted to urge the second part 10 of the housing 3 from the open state to the closed state. As the latch pins 45 engage the leading angled edges 57 of the respective latches 40, the latches 40 are urged in the direction of the arrow D about the pivot shafts 43 against the action of the tension spring 55 to accommodate the latch pins 45 past the engagement lugs 46, so that the latch pins 45 are reengaged by the latches 40 for retaining the second part 10 of the housing 3 in the closed state. Thereafter, the baler 1 is again towed by the tractor along the sward of crop material to form the next bale.

Figures 8, 10:
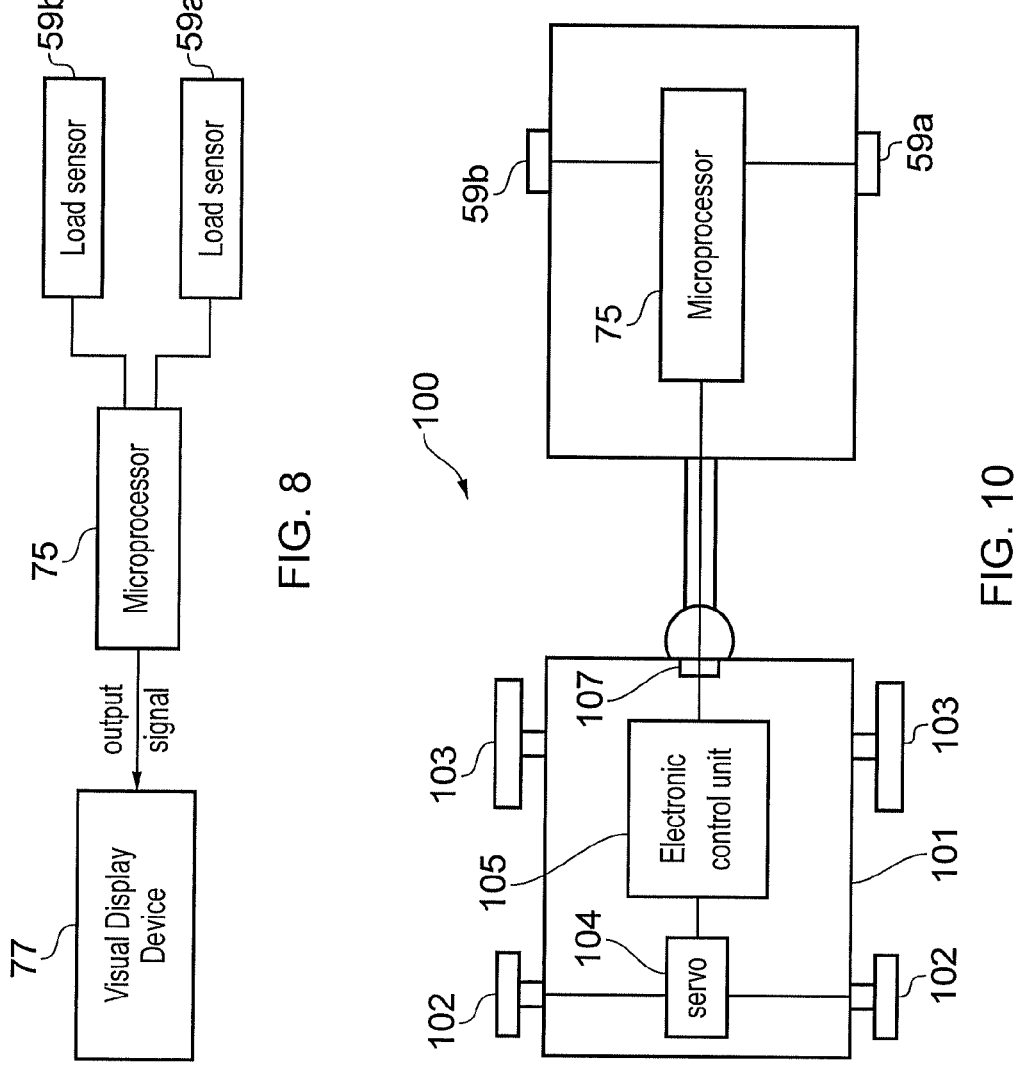
FIG. 8 is a circuit diagram of a control circuit of the apparatus of FIG. 1, FIGS. 9a to 9c are front elevational views of screens of a visual display device of the apparatus of FIG. 1 during use of the baler of FIG. 1.
FIG. 10 is a block representation of a combination also according to the invention of a prime mover and the baler of FIG. 1 hitched to the prime mover.
Figures 9A, 9B, 9C:
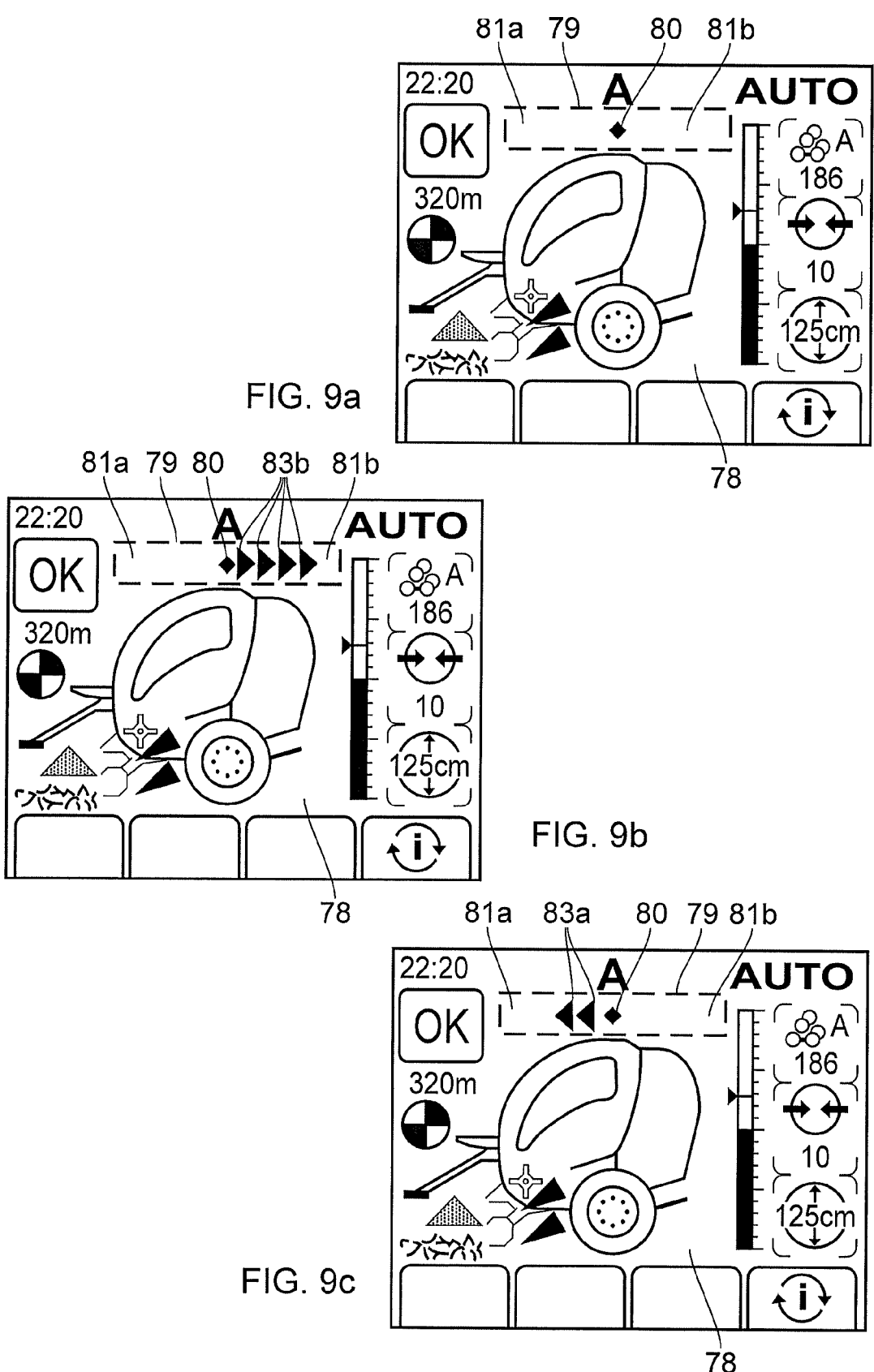

Referring now to FIG. 10 there is illustrated a block representation of a combination according to the invention and indicated generally by the reference numeral 100, comprising a prime mover, in this embodiment of the invention a tractor 101, and the baler 1 described with reference to FIGS. 1 to 9 also illustrated in block representation. The baler 1 is hitched to the tractor 101 in conventional fashion for towing the baler 1 along a sward of crop material to be baled. The tractor 101 comprises forward steerable ground engaging wheels 102, and a pair of rear ground engaging wheels 103. The forward steerable ground engaging wheels 102 are steered by a servomechanism 104 under the control of an electronic control unit 105. The steering of tractors such as the tractor 101 by a servomechanism under the control of an electronic control unit will be well known to those skilled in the art, and further description should not be required.

The microprocessor 75 of the baler 1 is hardwired to the electronic control unit 105 of the tractor 101 through a releasable plug connector 107. The output signal from the microprocessor 75 comprises a control signal for applying to the electronic control unit 105 of the tractor 101 to control the steering of the tractor 101 through the servomechanism 104, for in turn maintaining the density of the bale uniform across the axial length thereof, or for correcting for any non-uniformity of the density of the bale across the axial length thereof, as the bale is being formed in the bale chamber 25.

The electronic control unit 105 of the tractor 101 is adapted so that in response to receiving the control signal from the microprocessor 75 of the baler 1, the electronic control unit 105 appropriately operates the servomechanism 104 of the forward steerable wheels 102 for appropriately steering the tractor 101, to in turn control the direction of travel of the baler 1 to maintain the density of the bale being formed in the baler 1 uniform across the axial length of the bale, or to correct for non-uniformity of the density of the bale across the axial length thereof.

The control signal outputted by the microprocessor 75 which is applied to the electronic control unit 105 of the tractor 101 is substantially similar to that applied to the visual display device 77 and contains a signal which is indicative of the direction in which the tractor 101 should be steered, either straight ahead, or to the left or right, as the case may be, and where the tractor is to be steered to the left or right, the control signal from the microprocessor 75 also includes a signal indicative of the degree of steering to be applied to the forward steerable wheels 102 when the output signal is indicative of a requirement to steer the steerable wheels 102 of the tractor 101 to the left or to the right.

In this embodiment of the invention the visual display device 77 may also be located in the cab of the tractor which would also indicate to the driver of the tractor the steering requirement to be applied to the tractor, so that the tractor driver could monitor how the forward steerable wheels 102 are being operated by the servomechanism 104 under the electronic control unit 105 of the tractor 101.

Otherwise, the baler 1 of the combination 100 and its use is similar to the baler 1 described with reference to FIGS. 1 to 9.

While the baler has been described as comprising a belt baler, in some embodiments of the invention it is envisaged that the apparatus 2 according to the invention may be used in conjunction with a fixed chamber baler. However, in a fixed chamber baler, the apparatus 2 would only be capable of determining the uniformity of the density of the bale across the axial length thereof as the bale is nearing its maximum size, since it is only at that stage that the pressing action of the rotatable bale rotating rollers of the fixed chamber baler commence to act on the bale.

While the retaining devices on the respective opposite sides of the baler for retaining the second part of the housing of the baler in the closed state have been described as comprising latches and corresponding latch pins, any other suitable retaining devices for retaining the second part of the housing of the baler in the closed state may be provided. For example, in some embodiments of the invention it is envisaged that rams, for example, hydraulic rams, may be used for retaining the second part of the housing of the baler in the closed state, and in which case, it is envisaged that instead of providing load sensors for monitoring the force indicative of the force with which the rams retain the second part of the baler in the closed state, pressure sensors may be provided for monitoring the pressure of the hydraulic fluid pressurising the rams for retaining the second part of the housing in the closed state, since the pressure in the respective rams would be indicative of the forces induced in the rams by the pressure being applied to the bale being formed by the belt or belts of a belt baler, or the bale rotating rollers of a fixed chamber baler as the bale is being formed.

Needless to say, any other suitable retaining devices may be provided, and where the retaining devices are provided in the form of respective latches and latch pins or other receivers, the latch may be provided on either one of the first part or the second part of the housing, and the receiver or latch pin would be provided on the other one of the first and second parts of the housing.

It will also be appreciated that while in the embodiment of the invention described, the output signal from the microprocessor 75 has been configured to produce a visually perceptible signal which is displayed on a screen of a visual display device in the cab of a tractor or other towing vehicle, any other suitable output signal may be provided. For example, the human sensory perceptible signal may be an aurally perceptible signal, which could indicate by sound from two spaced apart sounders, for example, piezo electric sounders which could be located in the tractor cab on the respective left-hand side and right-hand side of the tractor, which would indicate the direction in which the tractor is to be steered or if the tractor is to be steered dead ahead. The sounder on the left-hand side of the cab would be operated to indicate that the tractor should be steered to the left, and the right-hand sounder would be activated to indicate that the tractor should be steered to the right. The volume of the sound or the intensity thereof or the frequency thereof, could be used to indicate the degree of steering required to correct the non-uniformity of the density of the bale across the axial length thereof. Silence from the two sounders would indicate that the tractor should be steered dead ahead.

It is also envisaged that the output signal from the microprocessor 75 could be an output signal which would activate two spaced apart light emitters located in the tractor cab at respective opposite left-hand and right-hand sides of the cab. The light emitter at the left-hand side, when activated, would indicate that the tractor should be steered to the left, and activation of the light emitter on the right-hand side of the cab would indicate that the tractor should be steered to the right. The intensity of the light output of the respective light emitters would indicate the degree of steering to the left or right, as the case may be. Both light emitters in the deactivated state or both in the active state would indicate that the tractor should be steered dead ahead relative to the sward of crop material.

Needless to say, any other suitable visually perceptible signal may be displayed on the visual display device which would indicate the direction of travel of the tractor, and if left-hand or right-hand steering of the tractor was required, and the degree of steering required.

While the signal processor of the apparatus for determining the uniformity of the density across the axial length of the bale has been described as comprising a microprocessor, any other suitable signal processor may be provided. In some embodiments of the invention, it is envisaged that the signal processor may be provided in the form of a logic controller.

It is also envisaged that in some embodiments of the invention instead of providing a dedicated signal processor for the apparatus 2, the signal processing could be carried out in the signal processor of the baler for controlling the operation of the baler, and in which case, the signal processor of the baler, be it a microprocessor or otherwise, would be appropriately programmed to read the signals from the load sensors, and to carry out the necessary computations as already described.

It is also envisaged that the monitoring means, instead of being provided by load sensors, may be provided by any other suitable monitoring means, and in some embodiments of the invention, instead of providing the monitoring means as a pair of load sensors, the monitoring means may be provided by a pair of strain sensors, which would monitor the strain induced in either the latch or latch pin or other receiver which would be indicative of the force induced in the corresponding retaining device. It is also envisaged that the distal end of each latch pin could be connected directly to the corresponding anchor location spaced apart from the latch pin by a single connecting member, and a corresponding strain gauge would be provided on each single connecting member for detecting the strain induced in that single connecting member by the deflection of the latch pin. The strain induced in each single connecting member would be proportional to the force induced in that single connecting member by deflection of the corresponding latch pin. Needless to say, a strain gauge could be secured to each latch for monitoring the strain induced in the corresponding latch, which would likewise be proportional to the force induced in the corresponding retaining device.

While the baler 1 has been described as comprising a baler of the type which is suitable for towing by a prime mover, such as, for example, a tractor, it is envisaged that in some embodiments of the invention the baler 1 may be a self-contained baler with its own power source, and with a cab for a driver for driving the baler. In which case, it is envisaged that the visual display device would be located in the cab of the baler, and/or, the output signal from the signal processor of the apparatus for determining uniformity of the density of a bale across the axial length thereof during formation of the bale in the baler, would be a control signal, which would control steerable wheels of the baler through a suitable servomechanism or other suitable control system.

The invention claimed is:

1. A method for determining uniformity of a density of a round bale across an axial length of the bale during formation of the bale by a baler, wherein the baler comprises:

a first part and a second part comprising a pressing means defining a bale chamber and for rotating and pressing the bale therein, the second part being moveable relative to the first part between a closed state with the pressing means operable to rotate and press a bale, and an open state for discharging the formed bale from the bale chamber, two retaining devices for releasably retaining the second part in the closed state, the retaining devices being spaced apart from each other in a direction parallel to the axial direction of the bale chamber, each retaining device comprising:

a receiver comprising a latch pin extending from one of the first and second parts of the baler, the latch pin of each receiver extending between a proximal end and a distal end, and being secured to the one of the first and second parts adjacent the proximal end thereof, and projecting therefrom to the distal end, and a latch coupled to the other one of the first and second parts of the baler and being releasably engageable with the latch pin of the corresponding retaining device for releasably retaining the second part in the closed state, the method comprising:

monitoring a characteristic indicative of the forces induced in the respective retaining devices when the latches are engaged with the corresponding latch pins retaining the second part in the closed state by monitoring a characteristic indicative of the deflections of the latch pins of the respective retaining devices at a location spaced apart from the proximal ends thereof, and determining the uniformity of the density of the bale across the axial length thereof as a function of the monitored characteristic indicative of the deflections of the latch pins of the respective retaining devices.

2. The method as claimed in claim 1 in which the uniformity of the density of the bale across the axial length thereof is determined as a function of the difference of the monitored characteristic indicative of the deflections of the latch pins of the respective retaining devices.

3. The method as claimed in claim 1 in which the method further comprises producing an output signal, the output signal comprising a signal indicative of one or both of the uniformity and non-uniformity of the density of the bale across the axial length thereof.

4. The method as claimed in claim 3 in which the output signal comprises a signal indicative of a direction of travel or a change in the direction of travel of the baler required to maintain uniformity of the density of the bale across the axial length thereof, or to correct for non-uniformity in the density of the bale across the axial length thereof.

5. The method as claimed in claim 1 in which the characteristic indicative of the deflection of each latch pin at the location spaced apart from the proximal end thereof is determined by monitoring a characteristic of the force induced in a connecting system extending between and connecting the latch pin adjacent the location at which the deflection is to be monitored and an anchor location on the one of the first and second parts of the baler, from which the latch pin extends, and spaced apart from the latch pin.

6. The method as claimed in claim 1 in which the characteristic indicative of the deflection of each latch pin is monitored adjacent the distal end of the latch pin.

7. The method as claimed in claim 3 in which the output signal comprises a signal indicative of the densities of the bale adjacent the respective axial opposite ends thereof.

8. The method as claimed in claim 4 in which the output signal is configured for applying to the baler or to a prime mover towing the baler for controlling the direction of travel of the baler or the prime mover for one of maintaining the density of the bale across the axial length thereof uniform, and correcting for non-uniformity of the density of the bale across the axial length thereof.

9. A baler comprising:

a first part and a second part comprising a pressing means defining a bale chamber and for rotating and pressing a round bale during formation thereof in the bale chamber, the second part being moveable relative to the first part and being operable between a closed state with the pressing means operable to rotate and press a bale, and an open state for discharging the bale from the bale chamber, two retaining devices for releasably retaining the second part of the baler in the closed state, the retaining devices being spaced apart from each other in a direction parallel to the axial direction of the bale chamber, each retaining device comprising:

a receiver comprising a latch pin extending from one of the first and second parts of the baler, the latch pin of each receiver extending between a proximal end and a distal end, and being secured to the one of the first and second parts adjacent the proximal end thereof, and projecting therefrom to the distal end, and a latch coupled to the other one of the first and second parts of the baler and being releasably engageable with the latch pin of the corresponding retaining device for releasably retaining the second part in the closed state, a monitoring means for monitoring a characteristic indicative of the forces induced in the respective retaining devices when the latches are engaged with the corresponding receivers latch pins retaining the second part in the closed state by monitoring a characteristic indicative of the deflections of the latch pins of the respective retaining devices at a location spaced apart from the proximal ends thereof, and for producing signals indicative of the monitored characteristic indicative of the deflections of the latch pins of the respective retaining devices, and a signal processor configured to read the signals produced by the monitoring means indicative of the monitored characteristic indicative of deflections of the latch pins of the respective retaining devices, and to determine uniformity of a density of the bale across an axial length thereof in response to the signals read from the monitoring means as a function of the monitored characteristic indicative of the deflections of the latch pins of the respective retaining devices.

10. The baler as claimed in claim 9 in which the signal processor is configured to produce an output signal, the output signal comprising a signal indicative of one or both of the uniformity or the non-uniformity of the density of the bale across the axial length thereof.

11. The baler as claimed in claim 10 in which the output signal produced by the signal processor comprises a control signal adapted for applying to the baler or to a prime mover towing the baler to control the direction of travel of the baler or the prime mover for maintaining the density of the bale across the axial length thereof uniform, or for correcting for non-uniformity of the density of the bale across the axial length thereof.

12. The baler as claimed in claim 9 in which a connecting system is provided corresponding to each retaining device, each connecting system extending between and connecting the latch pin of the corresponding retaining device at the location adjacent which the deflection of the latch pin is to be monitored, to a corresponding anchor location in the one of the first and second parts of the baler from which that latch pin extends spaced apart from that latch pin, and the monitoring means is configured to monitor a characteristic indicative of the forces induced in the connecting systems of the respective retaining devices in response to the deflections of the respective latch pins adjacent the locations thereof at which the deflections thereof are to be monitored.

13. The baler as claimed in claim 12 in which the connecting system of each retaining device is connected to the corresponding latch pin adjacent the distal end of the latch pin.

14. The baler as claimed in claim 10 in which the output signal produced by the signal processor comprises a signal indicative of the densities of the bale adjacent the respective axial opposite ends thereof.

15. The baler as claimed in claim 10 in which the output signal produced by the signal processor comprises a signal indicative of the direction of travel, or a change in the direction of travel of the baler required to maintain the density of the bale uniform across the axial length thereof, or to correct for non-uniformity of the density of the bale across the axial length thereof.

16. The baler as claimed in claim 11 in which the control signal of the output signal produced by the signal processor is adapted for applying to a steering system of the baler or a steering system of the prime mover for steering the baler or the prime mover.

* * * * *